US009026143B2

(12) United States Patent
Moeglein et al.

(10) Patent No.: US 9,026,143 B2
(45) Date of Patent: *May 5, 2015

(54) PROVIDING BASE STATION ALMANAC TO MOBILE STATION

(71) Applicant: QUALCOMM Incorporated, San Diego, CA (US)

(72) Inventors: Mark Leo Moeglein, Ashland, OR (US); Kirk Allan Burroughs, Alamo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/141,160

(22) Filed: Dec. 26, 2013

(65) Prior Publication Data
US 2014/0106789 A1    Apr. 17, 2014

Related U.S. Application Data

(63) Continuation of application No. 12/437,484, filed on May 7, 2009, now Pat. No. 8,644,853.

(60) Provisional application No. 61/052,571, filed on May 12, 2008.

(51) Int. Cl.
    *H04W 24/00*    (2009.01)
    *H04W 4/02*     (2009.01)
    *G01S 5/02*     (2010.01)

(52) U.S. Cl.
    CPC ............ *H04W 4/028* (2013.01); *G01S 5/0236* (2013.01); *H04W 24/00* (2013.01)

(58) Field of Classification Search
    CPC .............................. G01S 19/28; H04W 64/00
    USPC .............. 455/456.1, 456.6, 456.2, 13.3, 561;
                    370/352, 392, 338, 254, 331, 244, 341;
                    711/103; 717/126
    See application file for complete search history.

(56) References Cited

U.S. PATENT DOCUMENTS

| 6,058,338 | A  | 5/2000  | Agashe et al.  |
| 6,313,787 | B1 | 11/2001 | King et al.    |
| 6,433,734 | B1 | 8/2002  | Krasner        |
| 6,556,832 | B1 | 4/2003  | Soliman        |
| 6,768,448 | B2 | 7/2004  | Farmer         |
| 6,861,980 | B1 | 3/2005  | Rowitch et al. |
| 7,123,928 | B2 | 10/2006 | Moeglein et al.|

(Continued)

FOREIGN PATENT DOCUMENTS

| CN | 1343408 A | 4/2002 |
| CN | 1346569 A | 4/2002 |

(Continued)

OTHER PUBLICATIONS

Biacs, et al., "The Qualcomm/Snaptrack Wireless-Assited GPS Hybrid Positioning System and Results from Initial Commercial Deplyments" Proceedings of the Institute of Navistation (ION) GPS, XX, XX, Sep. 24, 2002, pp. 378-384, XP002325138.

(Continued)

*Primary Examiner* — Kiet Doan
(74) *Attorney, Agent, or Firm* — Thien T. Nguyen

(57) ABSTRACT

The subject matter disclosed herein relates to a hierarchal base station almanac received at a mobile station.

64 Claims, 7 Drawing Sheets

(56) References Cited

U.S. PATENT DOCUMENTS

| | | |
|---|---|---|
| 7,123,938 B2 | 10/2006 | Koga et al. |
| 7,127,257 B2 | 10/2006 | Riley et al. |
| 7,136,652 B2 | 11/2006 | Riley et al. |
| 7,139,765 B1 | 11/2006 | Balkany |
| 7,257,413 B2 | 8/2007 | Sheynblat |
| 7,302,261 B2 | 11/2007 | Rajkotia et al. |
| 7,376,430 B2 | 5/2008 | Matsuda |
| 7,463,979 B2 | 12/2008 | King |
| 7,495,608 B1 | 2/2009 | Chen et al. |
| 7,512,180 B2 | 3/2009 | Florencio |
| 7,602,338 B2 | 10/2009 | Smith et al. |
| 7,616,157 B2 | 11/2009 | Zhou |
| 7,747,257 B2 | 6/2010 | Zhao et al. |
| 7,847,727 B2 | 12/2010 | Hensley et al. |
| 7,916,072 B2 | 3/2011 | Corazza et al. |
| 7,973,708 B2 | 7/2011 | Lee et al. |
| 8,437,772 B2 | 5/2013 | Moeglein et al. |
| 2002/0136176 A1 | 9/2002 | Abeta et al. |
| 2002/0159470 A1 | 10/2002 | Atarashi et al. |
| 2003/0006931 A1 | 1/2003 | Mages |
| 2003/0043069 A1 | 3/2003 | Shamoto et al. |
| 2003/0050077 A1 | 3/2003 | Takeuchi et al. |
| 2003/0125044 A1 | 7/2003 | Deloach et al. |
| 2003/0125045 A1 | 7/2003 | Riley et al. |
| 2004/0203853 A1 | 10/2004 | Sheynblat |
| 2004/0263386 A1 | 12/2004 | King et al. |
| 2005/0027789 A1 | 2/2005 | Luo et al. |
| 2005/0037775 A1* | 2/2005 | Moeglein et al. .......... 455/456.1 |
| 2005/0090266 A1 | 4/2005 | Sheynblat |
| 2005/0280576 A1 | 12/2005 | Shemesh et al. |
| 2006/0227045 A1 | 10/2006 | Sheynblat |
| 2007/0254717 A1 | 11/2007 | Yahagi |
| 2007/0273581 A1 | 11/2007 | Garrison et al. |
| 2008/0032706 A1 | 2/2008 | Sheynblat et al. |
| 2008/0270026 A1 | 10/2008 | Han |
| 2008/0316091 A1 | 12/2008 | Wigren et al. |
| 2009/0085806 A1* | 4/2009 | Piersol et al. ................. 342/386 |
| 2009/0088183 A1 | 4/2009 | Piersol et al. |
| 2009/0280775 A1 | 11/2009 | Moeglein et al. |
| 2010/0178934 A1 | 7/2010 | Moeglein et al. |
| 2011/0057836 A1 | 3/2011 | Ische et al. |
| 2013/0190007 A1 | 7/2013 | Moeglein et al. |
| 2014/0232601 A1 | 8/2014 | Ische et al. |
| 2014/0370918 A1 | 12/2014 | Moeglein et al. |

FOREIGN PATENT DOCUMENTS

| | | |
|---|---|---|
| CN | 1363158 A | 8/2002 |
| CN | 1581993 A | 2/2005 |
| JP | 7093361 | 4/1995 |
| JP | 2003075526 A | 3/2003 |
| JP | 2003078943 A | 3/2003 |
| JP | 2009089396 A | 4/2009 |
| KR | 20090000876 | 1/2009 |
| RU | 2297715 C2 | 4/2007 |
| RU | 2319322 C2 | 3/2008 |
| TW | 200525167 A | 8/2005 |
| TW | 200718972 | 5/2007 |
| TW | I292829 B | 1/2008 |
| WO | WO-0052930 A1 | 9/2000 |
| WO | WO-2005004528 A1 | 1/2005 |
| WO | WO-2008124074 A1 | 10/2008 |

OTHER PUBLICATIONS

European Search Report—EP13020017—Search Authority—The Hague—Aug. 20, 2013.
International Search Report & Written Opinion—PCT/US2009/043482, International Search Authority—European Patent Office—Feb. 18, 2010.
Taiwan Search Report—TW098115716—TIPO-Aug. 21, 2012.

* cited by examiner

PROVIDING BASE STATION ALMANAC TO MOBILE STATION

CROSS-REFERENCE TO RELATED APPLICATIONS

The present application is a continuation application of and claims priority to U.S. application Ser. No. 12/437,484, entitled, "Providing Base Station Almanac to Mobile Station," filed on May 7, 2009, which claims priority to U.S. Provisional Application No. 61/052,571, entitled, "Providing Transmitter Information to a Mobile Device," filed on May 12, 2008, both of which are assigned to the assignee hereof and expressly incorporated herein by reference.

BACKGROUND

1. Field

The subject matter disclosed herein relates to providing a base station almanac for one or more wireless networks to a mobile station.

2. Information

The position of a mobile station, such as, for example, a cellular telephone, may be estimated based on information gathered from various systems. One such system may comprise the Global Positioning System (GPS), which is one example of a satellite positioning system (SPS). SPS systems such as GPS may comprise a number of space vehicles (SV) orbiting the earth. Another example of a system that may provide a basis for estimating the position of a mobile station is a cellular communication system comprising a number of terrestrial base stations to support communications for a number of mobile stations.

A position estimate, which may also be referred to as a position "fix", for a mobile station may be obtained based at least in part on distances or ranges from the mobile station to one or more transmitters, and also based at least in part on the locations of the one or more transmitters. Such transmitters may comprise SVs in the case of an SPS and/or terrestrial base stations in the case of a cellular communications system, for example. Ranges to the transmitters may be estimated based on signals transmitted by the transmitters and received at the mobile station. The location of the transmitters may be ascertained, in at least some cases, based on the identities of the transmitters, and the identities of the transmitters may be ascertained from signals received from the transmitters.

An almanac may be maintained for systems used for position estimation. The almanac may contain various types of information, including, for example, information that may be used in position estimation operations. Such information may include the identities and locations of the various transmitters of the system, for example.

SUMMARY

In an aspect, a hierarchal base station almanac may be received at a mobile station from a base station almanac server via a wireless communication network. In another aspect, the hierarchal base station almanac may comprise a plurality of levels configured in a hierarchal fashion, including a header and a sector level, wherein the header level comprises information common to a plurality of sectors listed in the sector level. In a further aspect, the hierarchal base station almanac may be stored in a memory of the mobile station, and a location of the mobile station may be estimated based, at least in part, on information from the hierarchal base station almanac.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
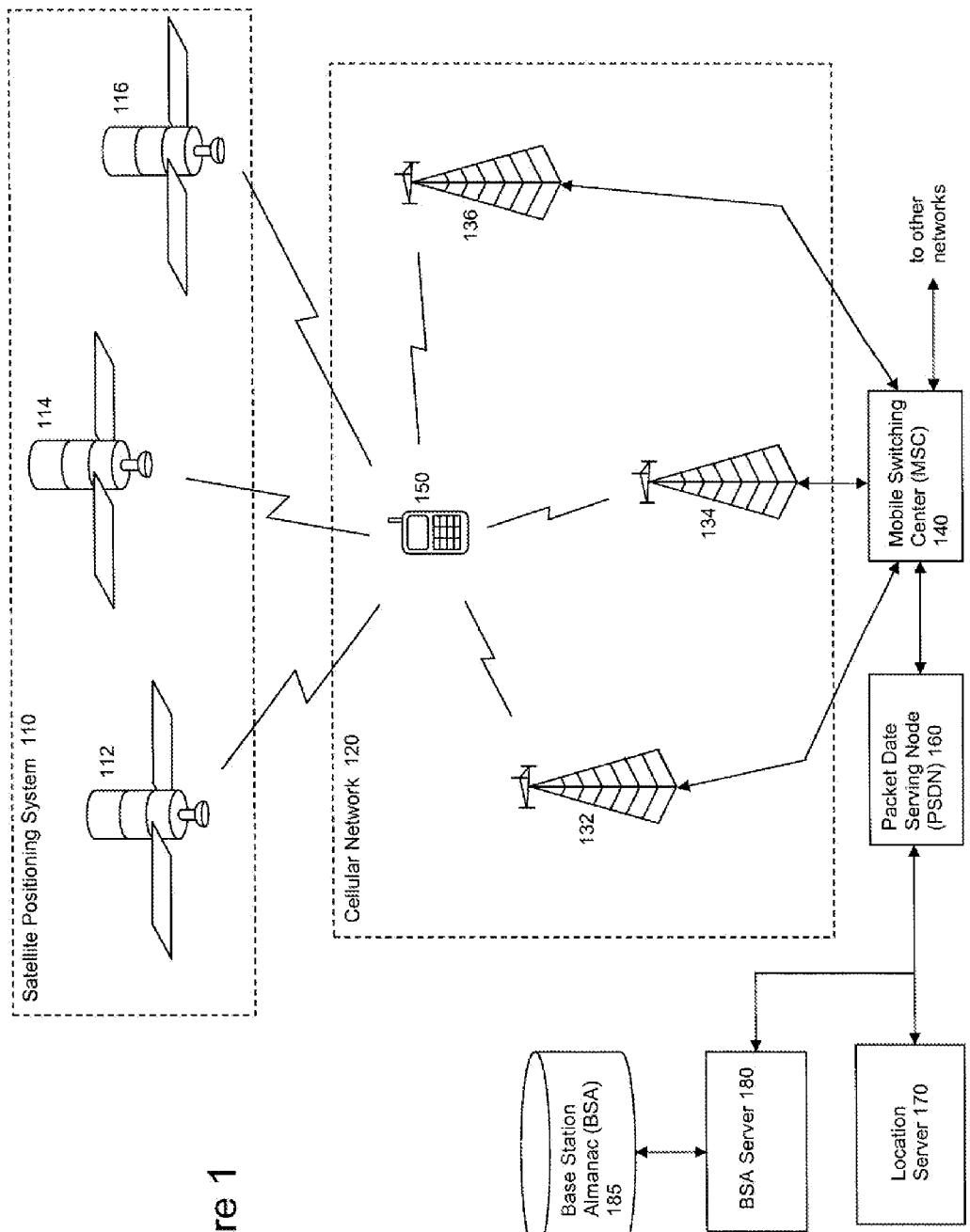
FIG. 1 is a schematic block diagram of an example satellite position system (SPS) and an example cellular network.

As discussed above, information in an almanac may be used to perform, at least in part, position estimation operations for mobile stations. A position estimate for a mobile station may be obtained based at least in part on distances or ranges from the mobile station to one or more transmitters such as space vehicles (SV) and/or terrestrial base stations, for example, and also based at least in part on the locations of the one or more transmitters. The range to the transmitters may be estimated based on signals transmitted by the transmitters and received at the mobile station. The location of the transmitters may be ascertained, in at least some cases, based on the identities of the transmitters, and the identities of the transmitters may be ascertained from signals received from the transmitters. As also mention previously, an almanac may contain various types of information, including, for example, the identities and locations of the various transmitters, for example.

Information related to various land-based transmitters of a wireless communication system may be stored in what may be referred to as a base station almanac (BSA). The term "base station almanac" as used herein is meant to include any organized set of information related to a plurality of transmitters of a wireless communication network. A base station almanac may be stored in a memory of a computing platform, such as a BSA server, for example, or in a memory of mobile station, for another example. In another aspect, the base station almanac may be transmitted from a BSA server to one or more mobile stations. In a further aspect, a subset of a BSA stored at a BSA server may be transmitted to one or more mobile stations.

In one aspect, a mobile station may use the received BSA information to perform position estimation operations, for example by trilateration using information and measurements from a number of transmitters. The mobile station may also use the received BSA information, in another aspect, to narrow a code phase search window for acquiring signals transmitted by an SPS in order to perform position estimation operations using, at least in part, measurements from signals received from one or more space vehicles (SV). For example, to narrow a search window, a mobile station may use base station almanac information to associate an identification of a sector currently serving the mobile station with a base station almanac entry. The entry may provide a location of the transmitter for the serving sector, from which an approximate location (within a couple of kilometers, for example) of the mobile station may be obtained.

Mobile stations may have a limited capacity for storing information, due at least in part to size and cost considerations. Typically, much information included in a base station almanac is repetitive due to similar parameters stored for most or all sectors for most or all transmitters across a wireless communications system, such as a cellular system. The information related to the various transmitters may be stored as a flat listing, where specified information for individual transmitters is stored in separate entries for all of the individual sectors for all of the individual transmitters, for example. Therefore, because of the repetitive nature of the transmitter information, and because of a mobile station's limited capacity for storing such information, it may be advantageous to more efficiently store transmitter information in a base station almanac by reducing unnecessary duplication of information.

In one aspect, information for a base station almanac may be stored using a hierarchal organization. The hierarchal organization may comprise a number of levels. In one example, a topmost level may comprise a header, and the lowest level may comprise a sector identification (SECTOR_ID) level. Rather than repeating information that may be common across all or nearly all sectors, the common information may be stored in the header. In this manner, a single instance of the common information may be stored in the header, and that information need not be repeated in all of the sector entries. In one aspect, it is understood that the information stored in the header is applicable to all entries of the sector level unless any exceptions are noted in individual entries of the sector level. In general, any information that would otherwise be repeated in a substantial number of entries of a conventional base station almanac may be stored in a single entry in an upper level of a hierarchal base station almanac, thereby greatly reducing the amount of repetition that would otherwise be found in conventional base station almanacs.

For merely one example, most or all sectors of a cellular communications system may transmit at a similar set of frequencies. Rather than repeating the list of frequencies in all sector entries, the list of frequencies may be stored in the header rather than in the individual sector entries. In another aspect, if any of the sectors of the cellular communications system employ frequencies that are not similar to the listing stored in the header, entries for those individual sectors may store information that may supercede or override the information stored in the header for those sectors. In this manner, repetitions for much of the information found in a base station almanac may be eliminated, and the information regarding base stations may be stored using less memory. Benefits to such an organization may include, but are not limited to, reduced base station almanac size and/or an increase in the capacity to store BSA information in a mobile station for use in position estimation operations.

FIG. 1 is a schematic block diagram of an SPS 110 and a cellular network 120 in communication with a mobile station 150. Cellular network 120, for this example, may provide voice communication for a number of mobile stations including mobile station 150, for example, and may further support position estimation for the mobile stations in addition to providing voice communication. Cellular network 120 may comprise any of a number of cellular network types, several examples of which are described below. Cellular network 120 for this example comprises base stations 132, 134, and 136 that provide communication for a number of wireless terminals such as, for example, mobile station 150. For simplicity, only a few base stations 132, 134, and 136 are depicted and one mobile station 150 is depicted in FIG. 1. Of course, other examples may include additional numbers of base stations, and the configuration of base stations depicted in FIG. 1 is merely an example configuration. Also, cellular network 120 is merely an example wireless communications system, and the scope of claimed subject matter is not limited in this respect.

As used herein, the term "base station" is meant to include any wireless communication station and/or device typically installed at a fixed terrestrial location and used to facilitate communication in a wireless communications system, such as, for example, a cellular network, although the scope of claimed subject matter is not limited in this respect. In another aspect, base stations may be included in any of a range of electronic device types. In an aspect, a base station may comprise a wireless local area network (WLAN) access point, for example. Such a WLAN may comprise an IEEE 802.11x network in an aspect, although the scope of claimed subject matter is not limited in this respect.

As used herein, the term "mobile station" (MS) refers to a device that may from time to time have a position location that changes. The changes in position location may comprise changes to direction, distance, orientation, etc., as a few examples. In particular examples, a mobile station may comprise a cellular telephone, wireless communication device, user equipment, laptop computer, other personal communication system (PCS) device, personal digital assistant (PDA), personal audio device (PAD), portable navigational device, and/or other portable communication devices. A mobile station may also comprise a processor and/or computing platform adapted to perform functions controlled by machine-readable instructions.

In an aspect, SPS 110 may comprise a number of SVs, for example SVs 112, 114, and 116. For an example, SPS 110 may comprise one or more satellite positioning systems, such as GPS, GLONASS and Galileo, although the scope of claimed subject matter is not limited in this respect. In one or more aspects, mobile station 150 may receive signals from SVs 112, 114, and 116, and may communicate with one or more of base stations 132, 134, and 136. For example, mobile station 150 may obtain one or more measurements from one or more signals received from one or more of the SVs and/or base stations. However, in some circumstances timing signals from an SPS may not be available. In such a circumstance, mobile station 150 may gather propagation delay information through communication with one or more of base stations 132, 134, and/or 136. Mobile station 150 may calculate a position location for the mobile station based, at least in part, on timing calibration parameters received through communication with one or more of base stations 132, 134, and/or 136, and further based, at least in part, on known position locations of the base stations. The mobile station may also make use of an estimated propagation delay for signals received from a base station source, a satellite source, or both.

In another aspect, position location determination calculations may be performed by a network entity such as, for example, location server 170 depicted in FIG. 1, rather than at mobile station 150. Such a calculation may be based, at least in part, on information gathered by mobile station 150 from one or more of base stations 132, 134, and/or 136. In a further aspect, location server 170 may transmit the calculated position location to mobile station 150.

A mobile switching center (MSC) 140 for this example may be coupled to base stations 132, 134, and 136, and may further couple to other systems and networks, such as a public switched telephone network (PSTN), a packet data serving node (PDSN) 160, and so on. MSC 140 for this example provides coordination and control for the base stations coupled to it and further controls the routing of data to/from the mobile stations served by these base stations. For the example depicted in FIG. 1, PDSN 160 may couple MSC 140 to location server 170 and to a BSA server 180. Location server 170 may collect and format location data, may provide assistance to mobile stations for position estimation, and/or may perform computations to obtain position estimates for the mobile stations. BSA server 180 manages a BSA database 185, which for this example stores a hierarchal base station almanac for cellular network 110.

In one aspect, base station server 180 may provide BSA information to mobile station 150. Information to be included in the BSA provided to mobile station 150 may be a subset of BSA database 185 selected based at least in part upon any of a number of parameters specified by the mobile station. Such parameters may include one or more networks or sub-networks specified by mobile station 150, the amount of the data mobile station 150 tells the network it can store, the specific content of the data, and/or the granularity of the data, to name but a few examples of parameters that may be specified by the mobile station. Such parameters may be referred to as base station almanac specification parameters. It should be appreciated that a Network ID may be descriptive of any ID parameter in the hierarchy, with the exception of the lowest level sector/cell identifier. For other examples of a specification parameter that may be specified by the mobile station, the request from mobile station 150 may be based at least in part upon a particular service provider, a particular network identifier, a mobile device capability, and/or a particular frequency or band class.

For yet more examples, mobile station 150 may request one or more different network types, with various levels of requested granularity and region size. In another aspect, the amount of information conveyed to the mobile station may be determined by network ID, available space, or geographic constraints. In an aspect, the geographic constraints may comprise, to name but a few examples, all transmitters within a certain radius or within a geographic region, or all transmitters whose coverage areas intersect a certain radius from a best known position of the mobile station, or all regions whose coverage areas overlap with a radius around the region in which the mobile is estimated to be. However, these are merely examples of how a mobile station may specify information to be included in a BSA information to be provided to the mobile station, and the scope of claimed subject matter is not limited in these respects.

By nature, a base station almanac such as BSA 185 may contain information that does not often change. However, in one aspect, cellular network 120 for this example may alert mobile station 150 that revised BSA information is available in the event cellular network 120 is modified in a way that warrants alerting the mobile station. Mobile station 150 may request revised BSA information at least in part in response to receiving such an alert from BSA server 250.

In another aspect, BSA information to be delivered to mobile station 150 may be formatted to provide relatively broad area coverage and relatively coarse information. Alternatively, the BSA information may be formatted to provide more refined coverage information, if such information is available. In this manner, mobile station 150 may specify a particular granularity or may specify a "best available" granularity in its request to BSA server 180. In another aspect, mobile station 150 may also request BSA information that is deemed to be highly reliable, or the mobile station may request any information available, perhaps with reliability information included. Example types of information that may be deemed to be highly reliable may include information provided by an owner of a transmitter where the information is thought to be accurate. Other example types may include information representing the amount of data used to determine the transmitter information or a confidence estimate. Other example types may include a parameter to indicate the level of completeness of the almanac information and/or its age. Of course, these are merely examples of information that may be deemed highly reliable or contribute to the understanding of the reliability of the almanac information, and the scope of claimed subject matter is not limited in this respect. Also, the scope of claimed subject matter is not limited to the above examples of how a mobile station may specify BSA information to be delivered to the mobile station.

Figure 2:
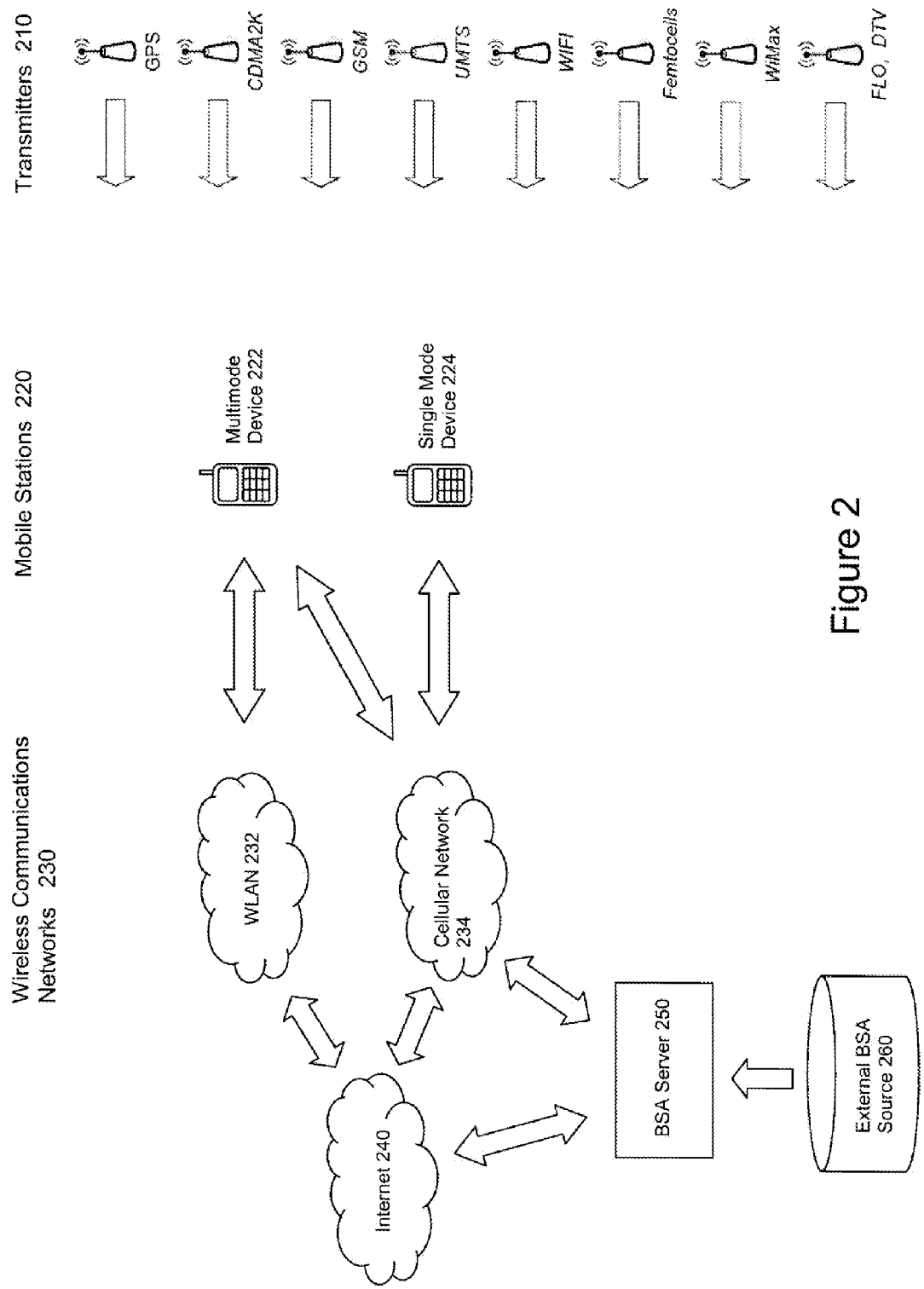
FIG. 2 is an illustration depicting an example base station almanac server in communication with a number of mobile stations via one or more wireless communication networks.

FIG. 2 is an illustration depicting an example base station almanac server 250 in communication with a number of mobile stations 222 and 224 via one or more wireless communication networks 232 and 234 and via Internet 240. For this example, mobile station 222 represents a multi-mode device that may support communication with both a packet-switched wireless local area network (WLAN) 232 and a cellular network 234. Of course, these are merely examples of the types of wireless communications networks with which a multimode device may communicate, and the scope of claimed subject matter is not limited in this respect. Also for this example, mobile station 224 represents a single-mode device that may support communication with cellular network 234. Again, the cellular network is merely one example of a wireless communication network with which a mobile station may establish communication.

FIG. 2 further depicts a number of transmitter types 210 that mobile stations 222 and 224 may monitor. Mobile stations 222 and 224 may or may not be subscribed to any given network associated with the various respective transmitter types to be able to monitor signals transmitted from the various transmitter types. Therefore, BSA information provided to the mobile stations may or may not include information associated with networks to which the mobile stations are not subscribed. As mentioned previously, mobile stations may specify particular networks and/or particular transmitter types while making requests for BSA information. For the example of FIG. 2, mobile stations 222 and 224 may request BSA information comprising at least a subset of a BSA database from BSA server 250.

In another aspect, BSA server 250 may obtain a BSA database from an external BSA source 260. For example, a cellular network provider may contract with a third party to develop and provide BSA information to BSA server 250. At least a subset of this information may eventually be transmitted to mobile stations 222 and/or 224. In a further aspect, BSA server 250 may receive BSA information from mobile stations 222 and/or 224 as the mobile stations develop such information at least in part through monitoring signals transmitted from one or more of example transmitters 210. Additionally, in another aspect, mobile stations 222 and/or 224 may select whether externally-provided BSA information should be delivered to the mobile station in response to the mobile station making such request or whether BSA information originally developed at least in part by the mobile stations should be delivered. In a further aspect, mobile stations 222 and/or 224 may select a combination of information from external and local sources.

Although the example of FIG. 2 depicts two mobile stations, in practice a wide variety of mobile station types exhibiting a wide range of different functionalities and/or storage capabilities may be utilized to communicate with a large variety of potential network types. Further, the mobile stations may exhibit a wide range of different usage patterns. Therefore, it may be advantageous for BSA server 250 to provide individualized subsets of BSA information that the individual mobile stations may require and/or request, and it may be further advantageous to provide such information formatted in a flexible manner according to a specified file size, coverage area, and/or transmitter type, to name but a few examples of parameters that may be specified. In one aspect, these parameters may be specified by the mobile stations.

In an aspect, a transmitter type may be defined according to signal frequency or band class. In another aspect, the type of transmitter may be defined according to network provider or carrier. Of course, these are merely examples of how a transmitter type may be defined, and the scope of claimed subject matter is not limited in these respects.

In a further aspect, coverage area may be defined by a specified size of a specified geometric shape, such as a radius around the mobile station, as a square or other rectangular grid, or as a hexagon, to name but a few example geometric shapes. Of course, any shape may be used, and the type of shape selected may depend at least in part on the mathematical complexities given a particular shape.

In an additional aspect, groups of transmitters whose information is to be included in the BSA information provided to a requesting mobile station may be determined in any number of ways. For one example, if individual coverage areas for all transmitters in a group of transmitters intersect the shape, or are wholly enclosed by the shape, or somewhere in between (for example, the estimated center of the coverage area is inside the shape), the given group of transmitters may have their information included in the BSA information provided to the requesting mobile station. For another example, if any of the transmitters of the group have coverage areas that intersect the shape, or are wholly enclosed by the shape, or somewhere in between (for example, the estimated center of the coverage area is inside the shape), the given group of transmitters may have their information included in the BSA information provided to the requesting mobile station. For yet another example, the determination of whether to include information for a given group of transmitters in the BSA information to be provided to a requesting mobile station may be made conditionally, based at least in part on available storage space in the requesting mobile station. For example, information for either individual transmitters or for groups of transmitters may be included, depending upon space availability, where information is added until a BSA information size threshold is reached. The BSA information size may be based, for example, upon a maximum size or upon a desired size of available storage space in the requesting mobile device.

Figure 3:
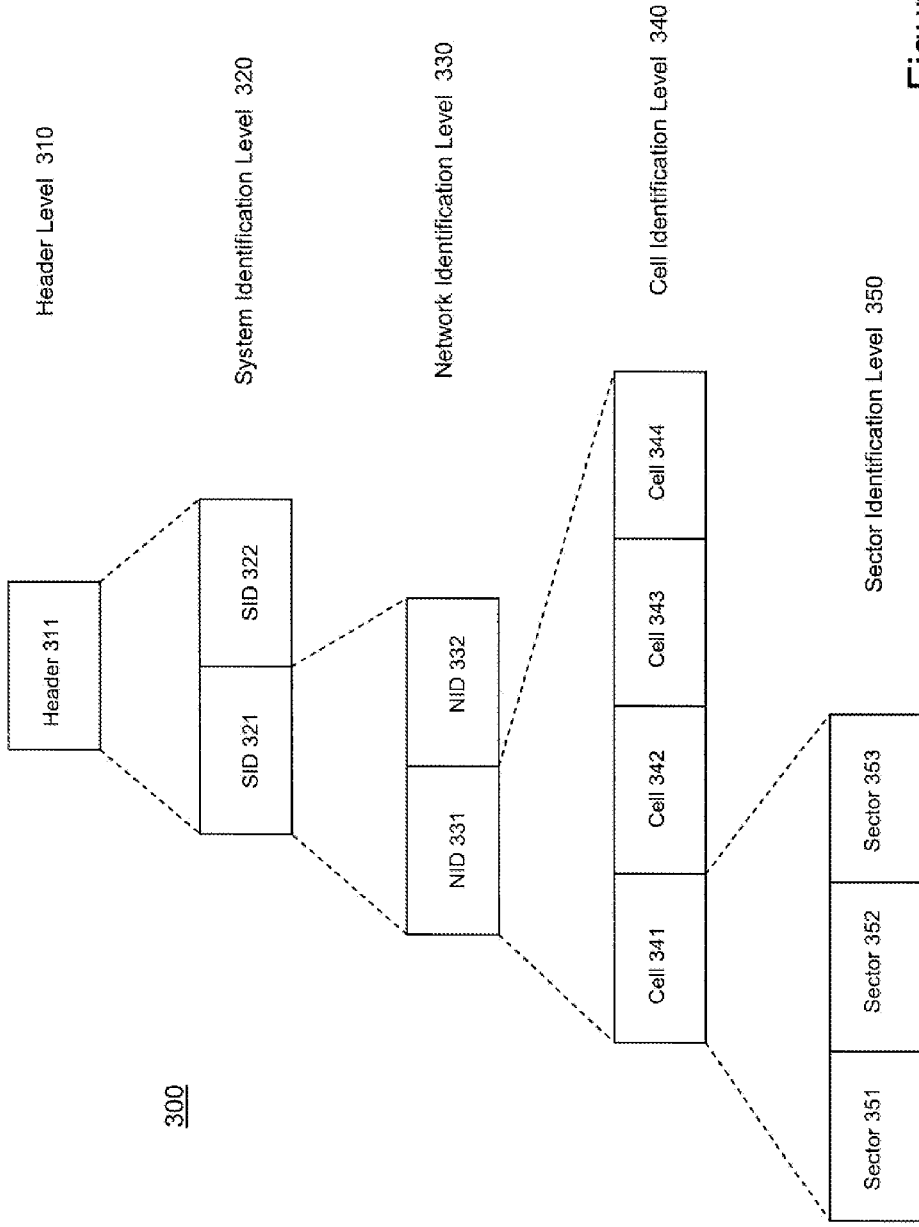
FIG. 3 is a schematic diagram illustrating an example hierarchal organization for a base station almanac.

FIG. 3 is a schematic diagram illustrating an example hierarchal organization for a base station almanac 300. BSA 300 in one aspect may represent a BSA stored at a BSA server such as BSA servers 180 and/or 250. In another aspect, BSA 300 may represent BSA information to be transmitted to a mobile station and stored in the mobile station. In the discussion that follows, example BSA encoding schemes are described, as are schemes for selecting information elements for the BSA. One example type of wireless network comprises a code division multiple access (CDMA) network. CDMA networks, similar to a number of other networks, comprise ID parameters that may be organized hierarchically. Therefore, it may be advantageous to convey an almanac for a given set of transmitters in a hierarchal fashion. For the example depicted in FIG. 3, BSA 300 may comprise a plurality of hierarchal levels. Also for the example depicted in FIG. 3, BSA 300 comprises a header level 310, a system identification (SID) level 320 that may comprise one or more system identification level entries, a network identification level (NID) 330 that may comprise one or more network identification level entries, a cell identification level 340, and a sector identification level 350. Also for the example of FIG. 3, SID level 320 comprises a pair of entries SID 321 and SID 322, NID level 330 comprises entries NID 331 and NID 332, cell identification level 340 comprises cell entries 341-344, and sector identification level 350 comprises sector entries 351-353. NID entries 331 and 332 may comprise one or more network identifiers that may identify one or more network providers, for one example. Cell entries 341-344 may comprise one or more cell identification values and/or one or more base station identifiers, and sector entries 351-353 may comprise one or more sector identification values, in an aspect. Of course, the example organization depicted for BSA 300 is merely an example, and the scope of claimed subject matter is not limited in these respects. For example, the scope of claimed subject matter is not limited to the specific numbers and/or types of levels depicted for BSA 300. Similarly, the scope of claimed subject matter is not limited to the depicted numbers and/or types of entries within the various levels of BSA 300.

For the example of BSA 300, for a given set of transmitters, an amount of information may be provided in header 311, and at least a portion of the information stored in header 311 may be referenced as descriptions are added in any of the lower levels of the hierarchy. For the present example, at any of the lower levels, the information stored in the header may be overridden for a particular entry, thereby allowing for exceptions to be made for the information stored in header 311. As previously mentioned, CDMA is merely an example network type. Universal Mobile Telecommunications System (UMTS) and Global System for Mobile communications (GSM) are other examples of hierarchically organized networks, each with variations in how they operate. For example, GSM comprises a Time Division Multiple Access (TDMA) based system, so frequency, slot timing and color code information may be stored in BSA 300. For CDMA, for example, pseudorandom number (PN) offset signal identifier information may be stored in BSA 300. For UMTS, for example, PN code signal identifier information may be stored in BSA 300. In one aspect, BSA 300 may store information for a single network type, or may store information for multiple network types. It should be noted that the above-referenced network types are merely examples, and the scope of claimed subject matter is not limited in this respect.

In an aspect, header 311 may include a collection of information. Several example types of information that may be stored in header 311 are described herein. However, these types of information are merely examples, and the scope of claimed subject matter is not limited in this respect. Header 311 may store an enumerated frequency list, for example. Because the set of frequencies supported tend to not vary much, if at all, from transmitter to transmitter and from sector to sector, a default set of frequencies may be assumed, and a listing of the default frequencies may be stored in header 311. That is, rather than store the list of supported frequencies in each cell or sector entry, the list of supported frequencies may be stored in header 311. In the event that a transmitter or sector supports a set of frequencies that differ from that stored in header 311, the exception(s) may be noted in an explicit entry in a lower level. For example, if a sector corresponding to sector entry 351 supports an alternate set of frequencies, those frequencies may be listed in sector entry 351 in sector identification level 350. The frequencies listed in the sector entry 351 for this example override the listing stored in header 311 as far as that particular sector is concerned.

In a further aspect, header 311 may store information related to the number of bits that are used for a sector ID. This may be advantageous because a sector ID may be encoded into a base station ID in many cases, but may be encoded in any of a number of different ways. In addition to the number of bits used for the sector ID, the information stored in header 311 may include information specifying whether the sector ID comprises the most significant bits of the base station ID or the least significant bits.

Continuing with the example of BSA 300, header 311 may store statistical information for BSA 300. Example statistics may include, but are not limited to, median size of a coverage area, median terrain height, range of terrain heights, number of bits used to convey terrain height offsets and the scale of those bits, timing information, and/or median and range of antenna position uncertainties found at cell identification level 340. In an aspect, the timing information may comprise one or more of median and range of forward link calibration values such as code division multiple access (CDMA) forward link calibration values, median and range of forward link calibration uncertainties, and/or a universal mobile telecommunications system (UMTS) frame timing relationship. Another example statistic may comprise the number of sectors per cell. In one aspect, the number of sectors per cell may be specified in header 311 if the number varies from the typical number of three sectors per cell. Although the information mentioned above is described as being stored at header 311, the scope of claimed subject matter is not limited in this respect, and such information may be pushed to lower levels of the hierarchy. In addition to some or all of the information described above, header 311 may further specify a value of a count of system identification (SID) entries to follow in system identification level 320, which for example BSA 300 comprises the next lower level beneath header 311 in the hierarchal organization.

In another aspect, general purpose information related to one or more systems may be provided. Information that may be listed in SID 321 and/or SID 322 for this example may comprise, for example, a system identifier and/or a coverage area shape, position and/or size. In one aspect, the position of the coverage area may be conveyed as an offset from a reference point. In an aspect, the reference point may be specified in header 311. Alternatively, in another aspect, the position of the coverage area may be conveyed in absolute terms. For example, the position may be conveyed as a longitude, latitude, and height above ellipsoid. Example coordinate systems that may be used include the World Geodesic System (WGS-84) and the Earth-Centered, Earth-Fixed (ECEF) coordinate system. SID entries 321 and 322 for this example may include a description of the number of NID entries that follow in the next lower level of the hierarchy. SID entries 321 and 322 may further include pointers to one or more NID entries that are associated with the respective SID entries, if any. For the example of BSA 300, no NID entries are associated with SID 322, while NID entries 331 and 332 are associated with SID 321. SID 321 may include a description of the number of NID entries associated with SID 321, and in one aspect SID may include a pointer to one or more of NID 331 and 332. In another aspect, a mechanism may be provided in the BSA encoding scheme to know the end of the NID entries.

Continuing with the example of BSA 300, the encoding at NID level 330 may be similar to that described above with respect to SID level 320. For example, at NID level 330, exceptions to information stored in SID 321 and/or header 311 may be noted in either or both of NID 331 or 332. For example, a given NID may support different frequencies from those listed in header 311. Those differences may be noted at NID level 330 in order to minimize the repetition of frequency difference information in the lower cell identification and/or sector identification levels. Other exceptions may be noted that may be related to any of the statistical information listed in header 311, for example. Such noted exceptions within NID 331 and/or NID 332 may override the header information for those NID entries noting the exception, and for any entries from lower levels that are associated with the NID entries noting the exception. Additionally, for BSA 300, the NID entries may include the number of cell identification entries to follow, and the NID entries may further include one or more pointers to one or more cell identification entries. For example, as depicted in FIG. 3, NID 331 may indicate that four cell identification entries follow, and a pointer may be provided to one or more of cell identification entries 341-344 that are associate with NID 331. Alternatively, a mechanism may be provided in the BSA encoding scheme to know the end of the cell identification entries.

In another aspect, cell identification layer 340 for BSA 300 comprises cell identification entries 341, 342, 343, and 344. The individual cell identification entries may comprise cell IDs and may comprise positions for the antennas associated with the individual cells. As previously mentioned, a base station ID may comprise a combination of a cell ID and a sector ID. For one example, a base station ID may comprise 16 bits, although the scope of claimed subject matter is not limited in this respect. If a particular number of bits of the base station ID are dedicated to the sector ID, only the cell ID bits need to be conveyed at cell identification level 340. In another aspect, any differences in antenna position from sector-to-sector may be noted in one or more entries of cell identification level 340. Also, antenna positions may be expressed as offsets from the NID reference position described above, or they may be expressed in absolute coordinates, similar to the coordinates described above in connection with NID level 330. Further, in an aspect, exceptions to the list of supported frequencies stored in header 311 or exceptions to any other list in other higher levels of the hierarchy may be noted in one or more of cell entries 341-344. One or more of cell entries 341-344 may further include information related to uncertainty properties related to antenna position and/or base station position. Additionally, for another example of the type of information that may be stored in one or more of the entries of cell identification level 340, one or more flags may be set to indicate that the number of sectors or the number of bits used to encode the sector identifiers varies from the typical value stored in a higher level entry. In another aspect, if the size of the coverage areas for the various sectors of associated with one or more of cell entries 341, 342, 343, and/or 344 are similar, the cell entries with the similar coverage areas for their respective sectors may include the sector coverage area information so that the information need not be repeated in each sector entry. Such information may also be store in higher levels of the hierarchy in some circumstances, depending on the uniformity of the coverage areas across the sector of the various cells.

At sector identification level 350, which for this example comprises sector entries 351-353 associated with cell entry 341, any exceptions to the information stored in any of the higher levels of the hierarchy may be noted. In an aspect, PN offset values may be explicitly noted. Further, offsets to any of the range of values defined at higher levels may also be noted. Such offsets may include, for example, antenna position offsets, forward link calibration offsets, terrain height information, frequency information, etc.

Although the above discussion in connection with BSA 300 depicted in FIG. 3 mentions specific examples of the types of information that may be stored at various layers of the hierarchy, and also mentions specific examples of relationships and configurations among various entries and various levels, such types of information and relationships and configurations are merely examples, and the scope of claimed subject matter is not limited in theses resects. For example, other implementations may comprise more levels than depicted in BS 300, or may comprise fewer levels. Similarly, additional types of information or fewer types of information may be included in BSA 300 than those discussed in the examples above.

As previously mentioned, referring back to FIGS. 2 and 3, mobile station 222 may request a subset of BSA information from BSA server 250. Mobile station 222 may specify information for a particular coverage area, for example, or may specify particular types of information, for another example. In one aspect, mobile station 222 may request BSA information for a relatively broad coverage area, and if the mobile station specifies a degree of flexibility with respect to the accuracy of the information, the BSA information may be provided without sector or cell descriptions, for example. In another aspect, a determination to exclude certain BSA information may be based at least in part on any of a range of variables. For example, mobile station 222 may specify that it only wants BSA information to the nearest 75 km. Assume for this example that mobile station 222 is positioned within the coverage area of sector 351. In this case, for example, cell identification level 340 along with sector level 350 from BSA 300 may be omitted, so long as the coverage area for NID 331 is not so large as to not meet the level of accuracy specified by mobile station 222. If the coverage area for NID 331 exceeds a threshold in size determined at least in part based on the level of accuracy specified by mobile station 222, then information from cell identification entry 341 may be included in the BSA subset in order to satisfy the specified level of accuracy. Similarly, sector information may be provided for a situation where the size of the coverage area for cell entry 341 exceeds a given uncertainty. In a further aspect, mobile station 222 may optionally request terrain elevation data and/or forward link calibration data, or may specify that such information be excluded, for example. In an additional aspect, mobile station 222 may also specify varying levels of granularity for one, more than one, or all parameters.

In another aspect, a mobile station may wish to receive information regarding antenna locations for multiple wireless network providers. In some cases, several wireless network providers may share a tower location. In such cases, it may be useful to describe the antenna positions in a list format, with references to the list from appropriate cell or sector level entries. In one aspect, such a list may be stored in an appropriate entry in system identification level 320 or in header 311. In this manner, a mixed-carrier and/or mixed air-interface BSA file may be fashioned that encodes the BSA efficiently.

In an additional aspect, some networks do not utilize hierarchical encoding schemes. Wireless access points, such as those that may be part of WLAN 232, for example, may be organized in an ad hoc manner, according to where their owners place them. A wireless access point almanac is likely to be more dense, due to a larger number of transmitters. The wireless transmitters to be included in a BSA subset to be transmitted to a mobile station such as multimode device 222 may be selected based at least in part on their locations within a geometrically shaped area specified by the mobile station, and/or by the inclusion of their coverage areas in the specified area. The granularity of the information provided may be greater at the center of the area of interest than at locations farther away, in one aspect. This would allow mobile station 222 to receive BSA information from BSA server 250 with more density and accuracy where mobile station 222 is likely to be located in the near term, but also have almanac information for a broader area. For example, mobile station 222 may specify in its request to BSA server 250 the most dense almanac nearest its own estimated location, and may also specify more coarse almanac information at further distances. The selection of transmitters to include in the BSA subset transmitted to mobile station 222 may also depend, at least in part, on how often the transmitters' signals are detected by a given mobile, or how often they are reported on by all mobiles.

Continuing to refer to FIGS. 2 and 3, mobile station 222 may specify in its request to BSA server 250 an almanac including all access points for a given carrier, for example. In another aspect, mobile station 222 may specify access points using a variety of methods, including, for example, access points at any airports within a specified region, or within reasonable proximity of an airport closest to the current location of the mobile station, or access points along a given roadway or group of roadways. These are examples of how a mobile station may specify to an almanac server what information to include in the almanac to be delivered to the mobile station. Of course, the scope of claimed subject matter is not limited to these particular examples.

In a further aspect, mobile station 222 may receive a BSA subset from BSA server 250 information related to wireless access points and/or base station transmitters within regions surrounding a number of airports that may represent likely destinations for a user of the mobile station. For example, BSA server 250 may be provided with information describing a number of likely destination airports given a departure airport. In an aspect, the likely destination airports may be determined by analyzing which airports may be reached in a single hop from the departure airport, although the scope of claimed subject matter is not limited in this respect. BSA server 250 may receive a recent location from mobile station 222 and may determine the departure airport from the recent location information. In this manner, mobile station 222 may be provided BSA information for a number of likely destinations prior to departing on an airplane to some destination. This airport almanac information may help mobile station 222 to find its bearings upon startup at a given destination airport. From the airport almanac information, mobile station 222 may enhance its search strategies for other transmitter types, particularly asynchronous networks, which may be difficult to locate. This example technique may contribute to power savings and may reduce search time.

In a further aspect, the mobile station may receive a BSA subset based upon the roadway and/or direction in which it is traveling. Using a roadway database, the BSA server may provide an almanac of transmitters that the mobile station is likely to see upon a given journey.

Referring to FIG. 3, BSA 300, which as previously mentioned may represent a subset of BSA information provided to a mobile station based at least in part on a request from the mobile station, may be compressed using any of a wide range of data compression techniques known in the art. The entire BSA information file may be compressed, in one aspect, or only a portion of the BSA file may be compressed, in another aspect. The techniques described above for efficiently organizing a BSA combined with conventional compression techniques may provide greatly enhanced efficiency without requiring unduly complex encoding and decoding logic.

In an additional aspect, BSA 300 may be encrypted using an encryption key associated with BA 300 to generate an encrypted base station almanac to ensure that information requested by a mobile station such as mobile station 222 is not vulnerable to public inspection. BSA 300 may further be encapsulated, such that only a subset of functional units, such as lower level positioning processes and/or a communications section of an integrated circuit chip within mobile station 222 would have access to what might be considered sensitive information. In one aspect, an encryption key associated with BSA 300 may be stored in a local memory in mobile station 222 to enable decryption of the encrypted BSA information. The lower level positioning processes and/or communication section of the integrated circuit chip within mobile station 222 may decrypt the encrypted base station almanac using the associated encryption key.

In the examples described herein, a mobile station such as mobile station 222 is described as requesting BSA information from a BSA server such as server 250. In response to receiving the request from mobile station 222, BSA server 250 configures the appropriate information and delivers it to the mobile station. However, there may be a number of variations to these examples, in that there may be various techniques to communicate BSA information to mobile station 222. In some cases, the technique used may depend at least in part on the type of air interface. In some air interfaces, the transmitting entity may also be able to store and forward its own BSA information or that of its neighbors. For example, referring to FIG. 1, base station 132 may store BSA information, and may forward at least a portion of that BSA information to mobile station 150 upon receiving a request from mobile station 150. Base station 132 may compress and/or encrypt the information in accordance with the examples mentioned above. In another aspect, base station 132 may authenticate mobile station 150 before granting the mobile station's request for BSA information.

Additionally, in one aspect, base station 132 may periodically broadcast BSA information to all mobile stations that are within range and that have the capability and authority to communicate with base station 132. Such a transmission may be made with or without prompting from a mobile station or from another network entity. In another aspect, mobile station 150 may be provided a uniform resource locator (URL) that points to a network location from where mobile station 150 may obtain BSA information. For the example of FIG. 1, the network entity may comprise BSA server 180. However, as depicted in FIG. 2, a mobile station may also obtain database information from a third party BSA provider 260, for another example. In an aspect, a mobile station such as mobile station 224 may subscribe to a service from the third party BSA provider 260 that provides on-demand BSA updates. Alternatively, in another aspect, the third party BSA provider 260 may provide the updates on a periodic basis, or whenever a need arises due to system reconfiguration, for example.

As noted previously, BSA server 250 may receive BSA information from a third party in one aspect. In another aspect, BSA server 250 or any other network entity that stores BSA information, such as one or more base stations or access points, may receive BSA information gathered from one or more mobile stations. The information gathered from the mobile stations may comprise information gathered during position estimation operations, for example. In another aspect, some mobile stations may store a database of transmitters from which they have received signals. The database may comprise, in one aspect, certain attributes about those transmitters, such as, for example, location information, frequency, etc. This information may have been provided to the mobile stations by the wireless network, or the information may have been derived by the mobile stations themselves. Regardless of the source, the gathered information may be desirable in the development and maintenance of a BSA that may be used by any or all mobile stations in a given area.

In an additional aspect, a mobile station may be expected to report a specified amount of information to a base station almanac server, for example, in exchange for more complete BSA information. The information gathered and reported by the mobile station may comprise a series of locations along with respective location uncertainties, and may further comprise discovered attributes of transmitters the mobile station observed from those locations. The attributes might include transmitter identification information, for example, as well as signal frequency, relative and/or absolute signal strength, color coding, slot timing, and/or any other pertinent information that may help the BSA server to map the coverage area of the individual transmitters. The attributes may further include code phase for individual transmitters, and/or timing relationships between some standard timing source (such as SPS time) and the framing structure of one or more received signals.

Figure 4:
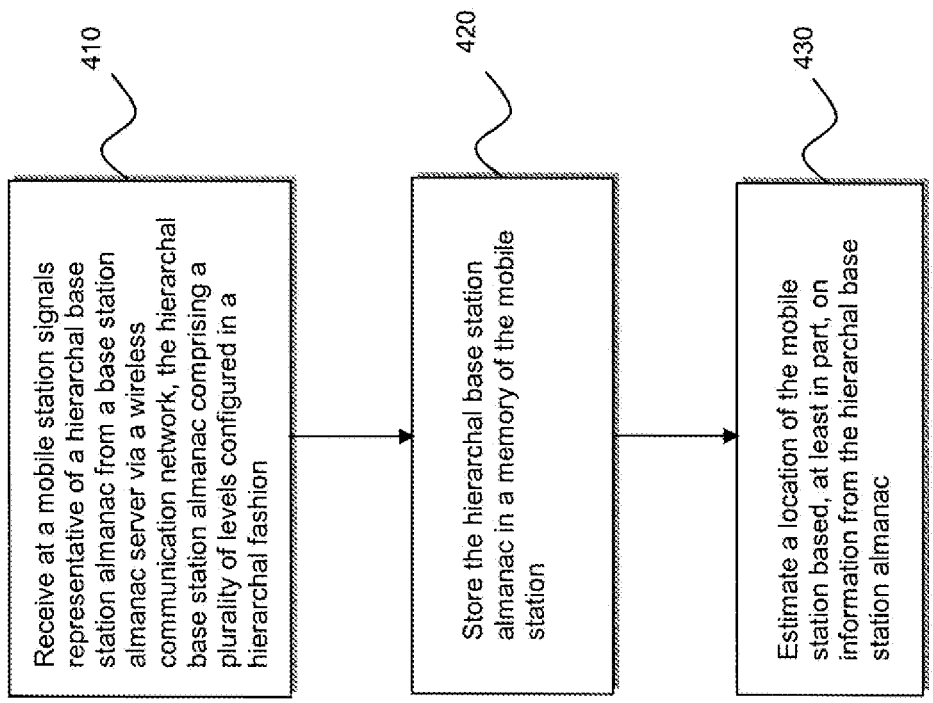
FIG. 4 is a flow diagram of an example process for receiving a hierarchal base station almanac at a mobile station.

FIG. 4 is a flow diagram of an example method for receiving a hierarchal base station almanac at a mobile station. At block 410, one or more signals representative of a hierarchal base station almanac is received at a mobile station from a base station almanac server via a wireless communication network. The hierarchal base station almanac comprises a plurality of levels configured in a hierarchal fashion, including a header and a sector level, wherein the header level comprises information common to a plurality of sectors listed in the sector level. At block 420, the hierarchal base station almanac is stored in a memory of the mobile station. At block 430, a location of the mobile station may be estimated based, at least in part, on information from the hierarchal base station almanac. In an aspect, the mobile station may estimate its location based at least in part on information from the hierarchal base station almanac. Examples in accordance with claimed subject matter may include all of, less than, or more than blocks 410-430. Further, the order of blocks 410-430 is merely an example order, and the scope of claimed subject matter is not limited in this respect.

Figure 5:
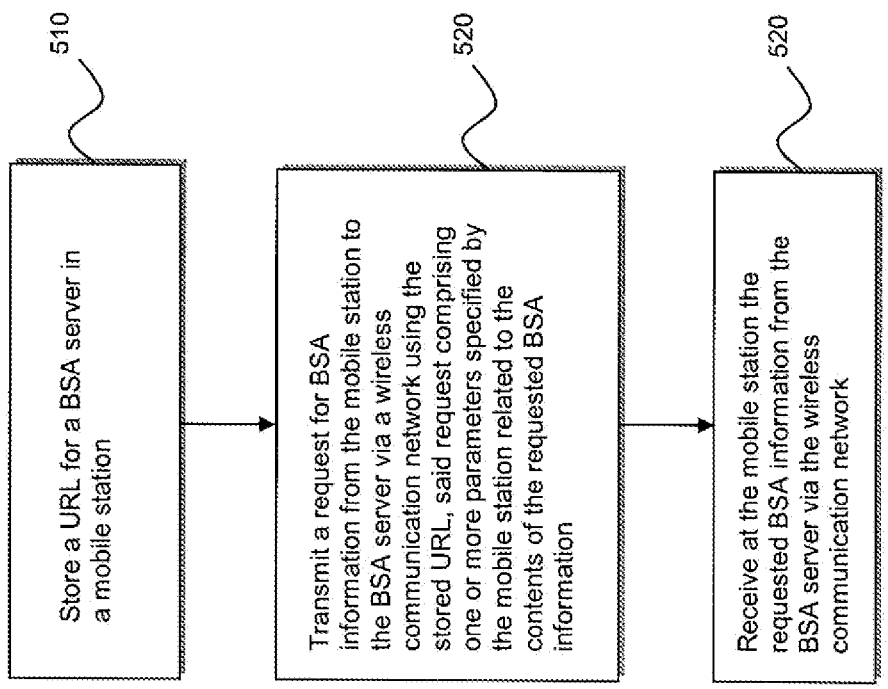
FIG. 5 is a flow diagram of an example process for transmitting a request for base station almanac information from a mobile station to a base station almanac server.

FIG. 5 is a flow diagram of an example method for transmitting a request for base station almanac information from a mobile station to a base station almanac server. At block 510, a uniform resource locator (URL) from a base station almanac server is stored in a memory of a mobile station. At block 520, a request for BSA information may be transmitted by the mobile station to the base station almanac server via a wireless communication network using the stored URL. The request from the mobile station may comprise one or more parameters specified by the mobile station related to the contents of the requested BSA information. At block 530, the requested BSA information is received at the mobile station from the base station almanac server via the wireless communication network. Examples in accordance with claimed subject matter may include all of, less than, or more than blocks 510-530. Further, the order of blocks 510-530 is merely an example order, and the scope of claimed subject matter is not limited in this respect.

In another aspect, estimating the location of the mobile station may include determining whether to search for a particular signal base based at least in part on information from the hierarchal base station almanac. In a further aspect, estimating the location of the mobile station may comprise determining a time window and/or a frequency window in which to search for signals from one or more base stations based, at least in part, on information from the hierarchal base station almanac. In an additional aspect, estimating the location of the mobile station may include calculating a range from a hypothetical mobile station position to a base station position contained in the hierarchal base station almanac. Of course, these are merely examples of how information from the hierarchal base station almanac may be utilized in estimating a position of a mobile station, and the scope of claimed subject matter is not limited in this respect.

Figure 6:
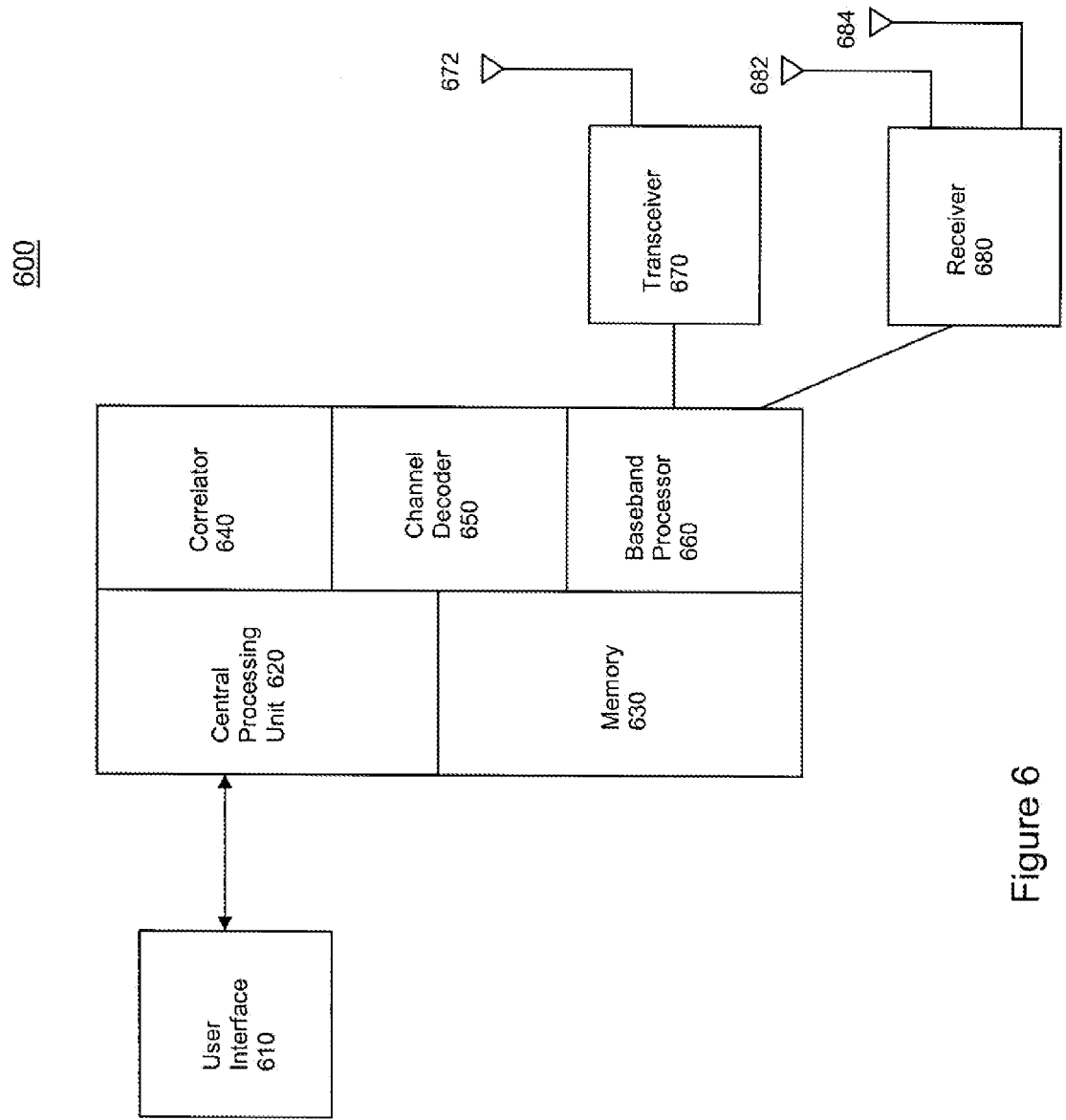
FIG. 6 is a schematic block diagram depicting an example mobile station.

FIG. 6 is a block diagram of an example of mobile station 150 that may be adapted to perform any of the example techniques described herein in connection with FIGS. 1-5. One or more radio transceivers 670 may be adapted to modulate an RF carrier signal with baseband information, such as voice or data, onto an RF carrier, and demodulate a modulated RF carrier to obtain such baseband information. An antenna 672 may be adapted to transmit a modulated RF carrier over a wireless communications link and receive a modulated RF carrier over a wireless communications link.

A baseband processor 660 may be adapted to provide baseband information from a central processing unit (CPU) 620 to transceiver 670 for transmission over a wireless communications link. Here, CPU 620 may obtain such baseband information from an input device within a user interface 610. Baseband processor 660 may also be adapted to provide baseband information from transceiver 670 to CPU 620 for transmission through an output device within user interface 610.

User interface 610 may comprise a plurality of devices for inputting or outputting user information such as voice or data. Such devices may include, by way of non-limiting examples, a keyboard, a display screen, a microphone, and a speaker.

A receiver 680 may be adapted to receive and demodulate transmissions from an SPS, and provide demodulated information to correlator 640. Correlator 640 may be adapted to derive correlation functions from the information provided by receiver 680. Correlator 640 may also be adapted to derive pilot-related correlation functions from information relating to pilot signals provided by transceiver 670. This information may be used by a mobile station to acquire wireless communications services. Channel decoder 650 may be adapted to decode channel symbols received from baseband processor 660 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 650 may comprise a turbo decoder.

A memory 630 may be adapted to store machine-readable instructions which are executable to perform one or more of processes, implementations, or examples thereof which are described or suggested herein. CPU 620 may be adapted to access and execute such machine-readable instructions.

Figure 7:
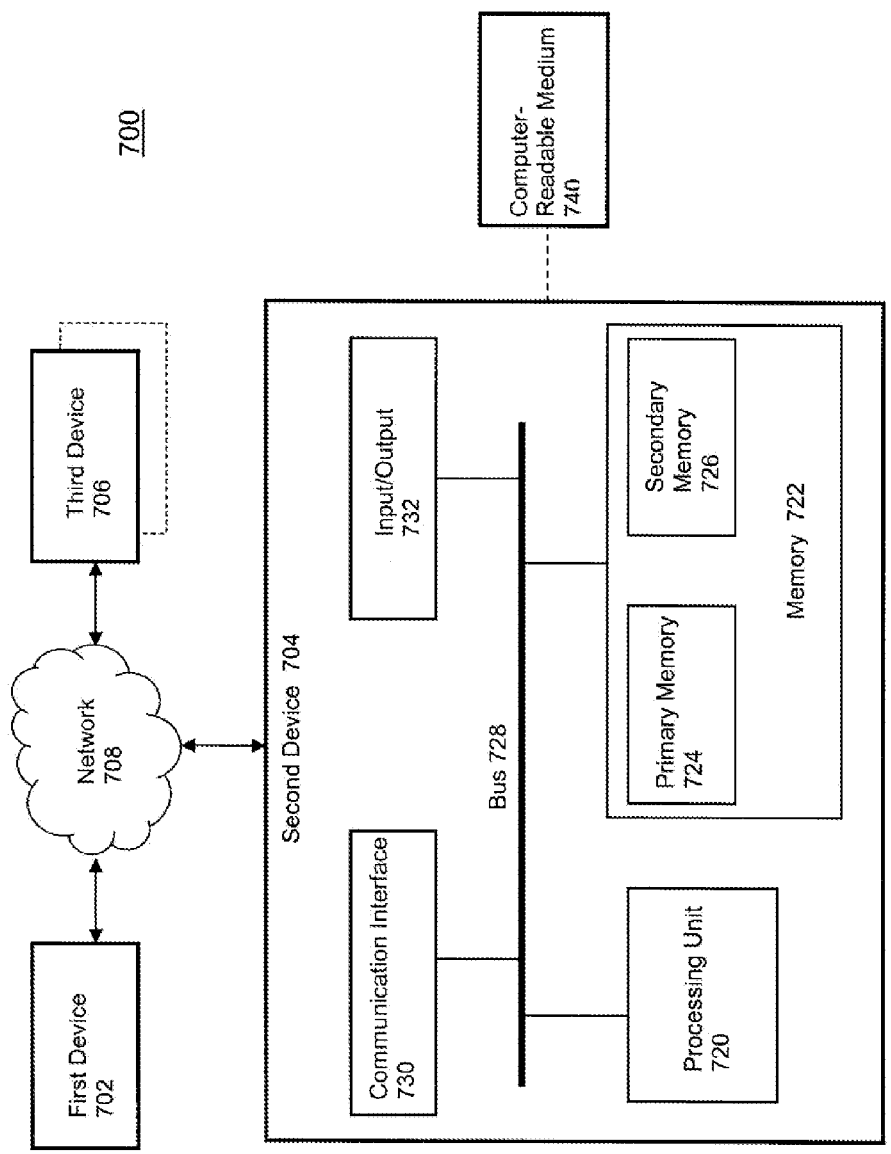
FIG. 7 is a schematic block diagram of an example computing platform.

FIG. 7 is a schematic diagram illustrating an example computing and communications environment 700 that may include one or more devices configurable to implement techniques and/or processes described above, for example, in connection with example techniques for requesting and transmitting BSA information depicted in FIGS. 1-5. System 700 may include, for example, a first device 702, a second device 704, and a third device 706, which may be operatively coupled together through a network 708.

First device 702, second device 704 and third device 706, as shown in FIG. 7, may be representative of any device, appliance or machine that may be configurable to exchange data over wireless communications network 708. By way of example but not limitation, any of first device 702, second device 704, or third device 706 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof. Any of the first, second, and third devices 702, 704, and 706, respectively, may comprise one or more of a base station almanac server, a base station, and/or a mobile station in accordance with the examples described herein.

Similarly, network 708, as shown in FIG. 5, is representative of one or more communication links, processes, and/or resources configurable to support the exchange of data between at least two of first device 702, second device 704, and third device 706. By way of example but not limitation, network 708 may include wireless and/or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 706, there may be additional like devices operatively coupled to network 708.

It is recognized that all or part of the various devices and networks shown in system 700, and the processes and methods as further described herein, may be implemented using or otherwise including hardware, firmware, software, or any combination thereof.

Thus, by way of example but not limitation, second device 704 may include at least one processing unit 720 that is operatively coupled to a memory 722 through a bus 728.

Processing unit 720 is representative of one or more circuits configurable to perform at least a portion of a data computing procedure or process. By way of example but not limitation, processing unit 720 may include one or more processors, controllers, microprocessors, microcontrollers, application specific integrated circuits, digital signal processors, programmable logic devices, field programmable gate arrays, and the like, or any combination thereof.

Memory 722 is representative of any data storage mechanism. Memory 722 may include, for example, a primary memory 724 and/or a secondary memory 726. Primary memory 724 may include, for example, a random access memory, read only memory, etc. While illustrated in this example as being separate from processing unit 720, it should be understood that all or part of primary memory 724 may be provided within or otherwise co-located/coupled with processing unit 720.

Secondary memory 726 may include, for example, the same or similar type of memory as primary memory and/or one or more data storage devices or systems, such as, for example, a disk drive, an optical disc drive, a tape drive, a solid state memory drive, etc. In certain implementations, secondary memory 726 may be operatively receptive of, or otherwise configurable to couple to, a computer-readable medium 740. Computer-readable medium 740 may include, for example, any medium that can carry and/or make accessible data, code and/or instructions for one or more of the devices in system 700. Computer readable medium 740 may also be referred to as a storage medium.

Second device 704 may include, for example, a communication interface 730 that provides for or otherwise supports the operative coupling of second device 704 to at least network 708. By way of example but not limitation, communication interface 730 may include a network interface device or card, a modem, a router, a switch, a transceiver, and the like.

Second device 704 may include, for example, an input/output 732. Input/output 732 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 732 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination of the above networks, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Wireless communication implementations described herein may also be used in connection with any combination of WWAN, WLAN and/or WPAN.

Techniques described herein may be used with any one or more of several SPS, including the aforementioned SPS, for example. Furthermore, such techniques may be used with positioning determination systems that utilize pseudolites or a combination of satellites and pseudolites. Pseudolites may comprise ground-based transmitters that broadcast a PRN code or other ranging code (e.g., similar to a GPS or CDMA cellular signal) modulated on an L-band (or other frequency)

carrier signal, which may be synchronized with GPS time. Such a transmitter may be assigned a unique PRN code so as to permit identification by a remote receiver. Pseudolites may be useful in situations where SPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

The terms, "and," "and/or," and "or" as used herein may include a variety of meanings that will depend at least in part upon the context in which it is used. Typically, "and/or" as well as "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

The invention claimed is:

1. A method, comprising:
receiving at a mobile station one or more signals representative of at least a subset of a hierarchal base station almanac from a base station almanac server via a wireless communication network, the hierarchal base station almanac comprising a plurality of levels configured in a hierarchal fashion, including an upper level and a lower level, wherein the upper level comprises information common to a plurality of entries listed in the lower level, wherein said common information is recorded as a single entry in the upper level;
storing information derived from the hierarchal base station almanac; and
estimating a location of the mobile station based, at least in part, on the information derived from the hierarchal base station almanac.

2. The method of claim 1, wherein the information derived from the hierarchal base station almanac comprises a coverage area whose position is expressed as an offset from a reference point.

3. The method of claim 1, wherein the information derived from the hierarchal base station almanac comprises a list of frequencies.

4. The method of claim 1, wherein the information derived from the hierarchal base station almanac comprises information associated with an LTE network.

5. The method of claim 1, wherein the information derived from the hierarchal base station almanac comprises information associated with a GSM network.

6. The method of claim 1, wherein the information derived from the hierarchal base station almanac comprises information associated with a UTRA network.

7. The method of claim 1, wherein the information derived from the hierarchal base station almanac comprises information associated with a WLAN network.

8. The method of claim 1, wherein the information derived from the hierarchal base station almanac comprises information associated with a group of transmitters.

9. A mobile station, comprising:
a receiver configured to receive one or more signals representative of at least a subset of a hierarchal base station almanac from a base station almanac server via a wireless communication network, the hierarchal base station almanac comprising a plurality of levels configured in a hierarchal fashion, including an upper level and a lower level, wherein the upper level comprises information common to a plurality of entries listed in the lower level, wherein said common information is recorded as a single entry in the upper level;
a memory configured to store information derived from the hierarchal base station almanac; and
a processor coupled to the memory and to the receiver, the processor configured to estimate a location of the mobile station based, at least in part, on the information derived from the hierarchal base station almanac.

10. The mobile station of claim 9, wherein the information derived from the hierarchal base station almanac comprises a coverage area whose position is expressed as an offset from a reference point.

11. The mobile station of claim 9, wherein the information derived from the hierarchal base station almanac comprises a list of frequencies.

12. The mobile station of claim 9, wherein the information derived from the hierarchal base station almanac comprises information associated with an LTE network.

13. The mobile station of claim 9, wherein the information derived from the hierarchal base station almanac comprises information associated with a GSM network.

14. The mobile station of claim 9, wherein the information derived from the hierarchal base station almanac comprises information associated with a UTRA network.

15. The mobile station of claim 9, wherein the information derived from the hierarchal base station almanac comprises information associated with a WLAN network.

16. The mobile station of claim 9, wherein the information derived from the hierarchal base station almanac comprises information associated with a group of transmitters.

17. An apparatus, comprising:
means for receiving at a mobile station one or more signals representative of at least a subset of a hierarchal base station almanac from a base station almanac server via a means for wireless communication, the hierarchal base station almanac comprising a plurality of levels configured in a hierarchal fashion, including an upper level and a lower level, wherein the upper level comprises information common to a plurality of entries listed in the lower level, wherein said common information is recorded as a single entry in the upper level;
means for storing information derived from the hierarchal base station almanac in the mobile station; and
means for estimating a location of the mobile station based, at least in part, on the information derived from the hierarchal base station almanac.

18. The apparatus of claim 17, wherein the information derived from the hierarchal base station almanac comprises a coverage area whose position is expressed as an offset from a reference point.

19. The apparatus of claim 17, wherein the information derived from the hierarchal base station almanac comprises a list of frequencies.

20. The apparatus of claim 17, wherein the information derived from the hierarchal base station almanac comprises information associated with an LTE network.

21. The apparatus of claim 17, wherein the information derived from the hierarchal base station almanac comprises information associated with a GSM network.

22. The apparatus of claim 17, wherein the information derived from the hierarchal base station almanac comprises information associated with a UTRA network.

23. The apparatus of claim 17, wherein the information derived from the hierarchal base station almanac comprises information associated with a WLAN network.

24. The apparatus of claim 17, wherein the information derived from the hierarchal base station almanac comprises information associated with a group of transmitters.

25. A non-transitory article, comprising: a storage medium having stored thereon instructions that, if executed, enable a processor in a mobile station to:
receive one or more signals representative of at least a subset of a hierarchal base station almanac from a base station almanac server, the hierarchal base station almanac comprising a plurality of levels configured in a hierarchal fashion, including an upper level and a lower level, wherein the upper level comprises information common to a plurality of entries listed in the lower level, wherein said common information is recorded as a single entry in the upper level;
store information derived from the hierarchal base station almanac; and
estimate a location of the mobile station based, at least in part, on the information derived from the hierarchal base station almanac.

26. The non-transitory article of claim 25, wherein the information derived from the hierarchal base station almanac comprises a coverage area whose position is expressed as an offset from a reference point.

27. The non-transitory article of claim 25, wherein the information derived from the hierarchal base station almanac comprises a list of frequencies.

28. The non-transitory article of claim 25, wherein the information derived from the hierarchal base station almanac comprises information associated with an LTE network.

29. The non-transitory article of claim 25, wherein the information derived from the hierarchal base station almanac comprises information associated with a GSM network.

30. The non-transitory article of claim 25, wherein the information derived from the hierarchal base station almanac comprises information associated with a UTRA network.

31. The non-transitory article of claim 25, wherein the information derived from the hierarchal base station almanac comprises information associated with a WLAN network.

32. The non-transitory article of claim 25, wherein the information derived from the hierarchal base station almanac comprises information associated with a group of transmitters.

33. A method comprising:
receiving at a base station server a request for information associated with a hierarchal base station almanac;
transmitting to a mobile station one or more signals representative of at least a subset of the hierarchal base station almanac from the base station server via a wireless communication network, the hierarchal base station almanac comprising a plurality of levels configured in a hierarchal fashion, including an upper level and a lower level, wherein the upper level comprises information common to a plurality of entries listed in the lower level, wherein the common information is recorded in the hierarchal base station almanac as a single entry in the upper level.

34. The method of claim 33, wherein the information associated with the hierarchal base station almanac comprises a coverage area whose position is expressed as an offset from a reference point.

35. The method of claim 33, wherein the information associated with the hierarchal base station almanac comprises a list of frequencies.

36. The method of claim 33, wherein the information associated with the hierarchal base station almanac comprises information associated with an LTE network.

37. The method of claim 33, wherein the information associated with the hierarchal base station almanac comprises information associated with a GSM network.

38. The method of claim 33, wherein the information associated with the hierarchal base station almanac comprises information associated with a UTRA network.

39. The method of claim 33, wherein the information associated with the hierarchal base station almanac comprises information associated with a WLAN network.

40. The method of claim 33, wherein the information associated with the hierarchal base station almanac comprises information associated with a group of transmitters.

41. A base station server comprising:
a receiver configured to receive a request for information associated with a hierarchal base station almanac; and
a transmitter configured to transmit to a mobile station one or more signals representative of at least a subset of the hierarchal base station almanac via a wireless communication network, the hierarchal base station almanac comprising a plurality of levels configured in a hierarchal fashion, including an upper level and a lower level, wherein the upper level comprises information common to a plurality of entries listed in the lower level, wherein the common information is recorded in the hierarchal base station almanac as a single entry in the upper level.

42. The base station server of claim 41, wherein the information associated with the hierarchal base station almanac comprises a coverage area whose position is expressed as an offset from a reference point.

43. The base station server of claim 41, wherein the information associated with the hierarchal base station almanac comprises a list of frequencies.

44. The base station server of claim 41, wherein the information associated with the hierarchal base station almanac comprises information associated with an LTE network.

45. The base station server of claim 41, wherein the information associated with the hierarchal base station almanac comprises information associated with a GSM network.

46. The base station server of claim 41, wherein the information associated with the hierarchal base station almanac comprises information associated with a UTRA network.

47. The base station server of claim 41, wherein the information associated with the hierarchal base station almanac comprises information associated with a WLAN network.

48. The base station server of claim 41, wherein the information associated with the hierarchal base station almanac comprises information associated with a group of transmitters.

49. An apparatus comprising:
  means for receiving a request for information associated with a hierarchal base station almanac; and
  means for transmitting to a mobile station one or more signals representative of at least a subset of the hierarchal base station almanac via means for wireless communication, the hierarchal base station almanac comprising a plurality of levels configured in a hierarchal fashion, including an upper level and a lower level, wherein the upper level comprises information common to a plurality of entries listed in the lower level, wherein the common information is recorded in the hierarchal base station almanac as a single entry in the upper level.

50. The apparatus of claim 49, wherein the information associated with the hierarchal base station almanac comprises a coverage area whose position is expressed as an offset from a reference point.

51. The apparatus of claim 49, wherein the information associated with the hierarchal base station almanac comprises a list of frequencies.

52. The apparatus of claim 49, wherein the information associated with the hierarchal base station almanac comprises information associated with an LTE network.

53. The apparatus of claim 49, wherein the information associated with the hierarchal base station almanac comprises information associated with a GSM network.

54. The apparatus of claim 49, wherein the information associated with the hierarchal base station almanac comprises information associated with a UTRA network.

55. The apparatus of claim 49, wherein the information associated with the hierarchal base station almanac comprises information associated with a WLAN network.

56. The apparatus of claim 49, wherein the information associated with the hierarchal base station almanac comprises information associated with a group of transmitters.

57. A non-transitory article, comprising: a storage medium having stored thereon instructions that, if executed, enable a processor in a base station server to:
  receive a request for information associated with a hierarchal base station almanac; and
  transmit to a mobile station one or more signals representative of at least a subset of the hierarchal base station almanac via a wireless communication network, the hierarchal base station almanac comprising a plurality of levels configured in a hierarchal fashion, including an upper level and a lower level, wherein the upper level comprises information common to a plurality of entries listed in the lower level, wherein the common information is recorded in the hierarchal base station almanac as a single entry in the upper level.

58. The non-transitory article of claim 57, wherein the information associated with the hierarchal base station almanac comprises a coverage area whose position is expressed as an offset from a reference point.

59. The non-transitory article of claim 57, wherein the information associated with the hierarchal base station almanac comprises a list of frequencies.

60. The non-transitory article of claim 57, wherein the information associated with the hierarchal base station almanac comprises information associated with an LTE network.

61. The non-transitory article of claim 57, wherein the information associated with the hierarchal base station almanac comprises information associated with a GSM network.

62. The non-transitory article of claim 57, wherein the information associated with the hierarchal base station almanac comprises information associated with a UTRA network.

63. The non-transitory article of claim 57, wherein the information associated with the hierarchal base station almanac comprises information associated with a WLAN network.

64. The non-transitory article of claim 57, wherein the information associated with the hierarchal base station almanac comprises information associated with a group of transmitters.

* * * * *